(12) United States Patent
Lothe

(10) Patent No.: US 7,625,438 B2
(45) Date of Patent: Dec. 1, 2009

(54) METHOD AND DEVICE FOR REMOVAL OF GASES FROM WATER

(75) Inventor: Per Lothe, Førresfjorden (NO)

(73) Assignee: Knutsen OAS Shipping AS (NO)

( * ) Notice: Subject to any disclaimer, the term of this patent is extended or adjusted under 35 U.S.C. 154(b) by 417 days.

(21) Appl. No.: 10/565,890

(22) PCT Filed: Jul. 22, 2004

(86) PCT No.: PCT/NO2004/000227

§ 371 (c)(1),
(2), (4) Date: Aug. 14, 2006

(87) PCT Pub. No.: WO2005/009907

PCT Pub. Date: Feb. 3, 2005

(65) Prior Publication Data

US 2007/0068860 A1  Mar. 29, 2007

(30) Foreign Application Priority Data

Jul. 24, 2003 (NO) ................................. 20033331

(51) Int. Cl.
*B01D 19/00* (2006.01)
(52) U.S. Cl. .............................. 96/195; 96/209; 96/202; 95/246; 95/248; 95/261; 95/265
(58) Field of Classification Search .................. 96/195, 96/194, 209, 202, 204; 95/246, 248, 261, 95/265, 266
See application file for complete search history.

(56) References Cited

U.S. PATENT DOCUMENTS 4,002,440 A * 1/1977 Saari ........................... 95/266
4,216,089 A * 8/1980 Boon et al. .................. 210/718
4,613,347 A   9/1986 Ranchet et al.
6,171,508 B1  1/2001 Browning, Jr.

(Continued)

FOREIGN PATENT DOCUMENTS

CA       1111785       11/1981

(Continued)

OTHER PUBLICATIONS

International Search Report dated Nov. 23, 2004.

(Continued)

*Primary Examiner*—Duane Smith
*Assistant Examiner*—Douglas J Theisen
(74) *Attorney, Agent, or Firm*—Andrus, Sceales, Starke & Sawall, LLP

(57) ABSTRACT

A method and device are provided for reducing the oxygen content of seawater, where the seawater is introduced into the upper part (14) of a downcomer (12), particularly for treatment of ballast water in a ballast tank (4) of a ship (1). A seawater intake pipe (6) runs from the outside of the ship to a ballast pump (8) that is designed to pump the water on through a pump pipe (10) and up to the upper part of the downcomer. The downcomer extends mainly vertically down to the ballast compartment of the ship, where the ballast water can be distributed between several ballast compartments by means of distribution headers and valves. One aim of the invention is to neutralize organisms in the ballast water.

4 Claims, 3 Drawing Sheets

U.S. PATENT DOCUMENTS

2002/0174814 A1   11/2002   Hunter
2003/0205136 A1 * 11/2003   McNulty .................... 95/265

FOREIGN PATENT DOCUMENTS

| DE | 224223 | 7/1985 |
| GB | 2171613 | 9/1986 |
| GB | 1531537 | 11/2004 |
| NO | 150074 | 5/1984 |
| WO | WO-02/062707 | 8/2002 |

OTHER PUBLICATIONS

Written Opinion dated Nov. 23, 2004.

* cited by examiner

METHOD AND DEVICE FOR REMOVAL OF GASES FROM WATER

CROSS-REFERENCE TO RELATED APPLICATIONS

This application is the U.S. national stage application of International Application PCT/NO2004/000227, filed Jul. 22, 2004, which International Application was published on Feb. 3, 2005, as International Publication No. WO 2005/009907 A1 in the English language. The International Application claims priority of Norwegian Patent Application 20033331, filed Jul. 24, 2003.

BACKGROUND OF THE INVENTION

This invention regards a method of removing gases from water. More particularly, it regards a method which is particularly suited for removing enough of the free oxygen in water e.g. to neutralize organisms in a ship's ballast water or to allow the water to be injected into a petroleum well. The invention also covers a device for implementing the method.

For technical reasons, a ship must carry a certain amount of cargo when sailing. As is well known, cargo that does not produce income is called ballast.

As it is relatively easy to load and unload, seawater is to a large extent used as ballast. Many species of organisms are transported with the ballast water from the loading site to the unloading site.

A great proportion of the living organisms die in transport, and more die when released at the unloading site. However, favourable conditions may allow a stock to survive and reproduce.

The introduction of alien organisms in a new place is known to have had disastrous consequences for among other things the fisheries of entire ocean areas.

International bodies are currently working out new guidelines on the treatment of ballast water with an eye to neutralizing organisms. The guidelines emphasize that the treatment of ballast water must be safe, environmentally acceptable and inexpensive in use, and it must work.

It has been proposed that ships change ballast while underway, in order to reduce the risk of carrying species to a new area. The method has met with resistance, especially from the authorities in those countries located near possible change-out areas.

When producing petroleum, it may be expedient to pump water is into a reservoir. The purpose of this may be to make residual petroleum gather on top of the water in order to achieve enhanced recovery.

A large proportion of the free oxygen in the water must be removed prior to pumping this into the reservoir.

SUMMARY OF THE INVENTION

The object of the invention is to provide a method and a device for removing a significant proportion of free gases from water. The invention is particularly directed at the treatment of ballast water and purification of injection water in connection with petroleum production.

The object is achieved in accordance with the invention, by the characteristics disclosed in the description below and in the subsequent claims.

Water to be degassed is introduced into the upper part of a mainly vertically arranged downcomer. The water falling through the downcomer produces a negative pressure, especially in the upper part of the downcomer, which causes the volume of the free gases in the water to increase. This facilitates the release of the gases from the water.

The so-called Froude number is known from the hydraulics of open conduits. The dimensionless Froude number is defined as a relationship between the force of inertia and the gravitational force acting on a fluid:

$$F = \frac{V}{\sqrt{gh_m}}$$

where

V=fluid velocity in metres per. second, g=acceleration due to gravity in metres per second$^2$, and $h_m$=the hydraulic mean depth.

Replacing the hydraulic depth $h_m$ of the formula with the diameter D of the pipe in question yields an expression that has proven appropriate for selecting suitable pipe diameters.

The development work carried out has shown that the gases are released when the value of the expression $$F_d = \frac{V}{\sqrt{gD}}$$

at the upper part of the downcomer exceeds 0.3. The best result is achieved at values of between 1.5 and 3.5.

Thus the diameter of the upper part of the downcomer is mainly dependent on the velocity of the incoming fluid.

In one embodiment, nitrogen and possibly carbon dioxide are introduced to the downcomer at the upper part of the downcomer. In the course of the drop through the downcomer, the gases mix with the water, and the nitrogen reacts with the oxygen in the water. The resulting gas, which in the main is of the same composition as air, rises to the surface of the ballast water and is released to the atmosphere.

In an alternative embodiment, the lower part of the downcomer is connected horizontally, preferably tangentially, to a vertically extending separating pipe with a significantly larger diameter than that of the downcomer. The water flows from the downcomer and into the separating pipe, where the velocity of flow of the water is gradually reduced as a result of the relatively large cross sectional area of the separating pipe.

An extraction pipe is connected to the upper part of the separating pipe at a slightly higher level than the point of connection of the downcomer to the separating pipe. The extraction pipe communicates with a blower assembly in order to maintain a moderate negative pressure in the extraction pipe.

This embodiment will not normally require the addition of external gas at the upper part of the downcomer. The free gases that separate from the water while the water is in the downcomer, flow along with the water into the separating pipe and is then drawn out through the extraction pipe while the water flows through the separating pipe to the outlet from the separating pipe.

The process may be repeated in a plurality of serial stages if there is a requirement for higher separation efficiency.

In a preferred embodiment, the downcomer has a minimum vertical length of ten metres, while the length of the separating pipe may be adjusted according to the purpose.

Experiments have shown that living organisms will die after spending a certain amount of time in oxygen-deficient water. Thus removing enough of the free oxygen from ballast water, without using environmentally undesirable chemicals, may neutralize organisms in the ballast water.

BRIEF DESCRIPTION OF THE DRAWINGS

In the following, a description is given of a non-limiting example of a preferred method and embodiment illustrated in the accompanying drawings, in which.

DETAILED DESCRIPTION OF THE DRAWINGS

Figure 1:
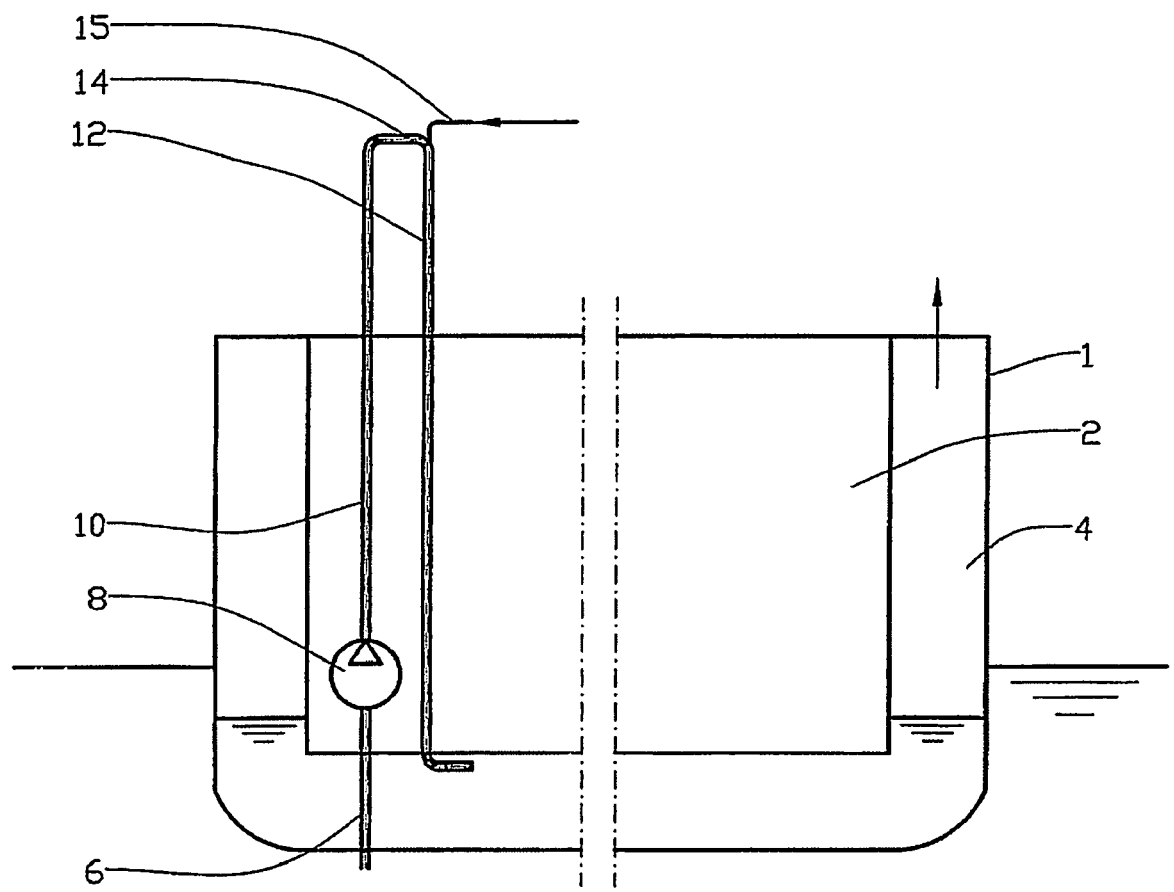
FIG. 1 is a schematic cross section of a ship fitted with a plant for extracting gases from ballast water.
Figure 2:
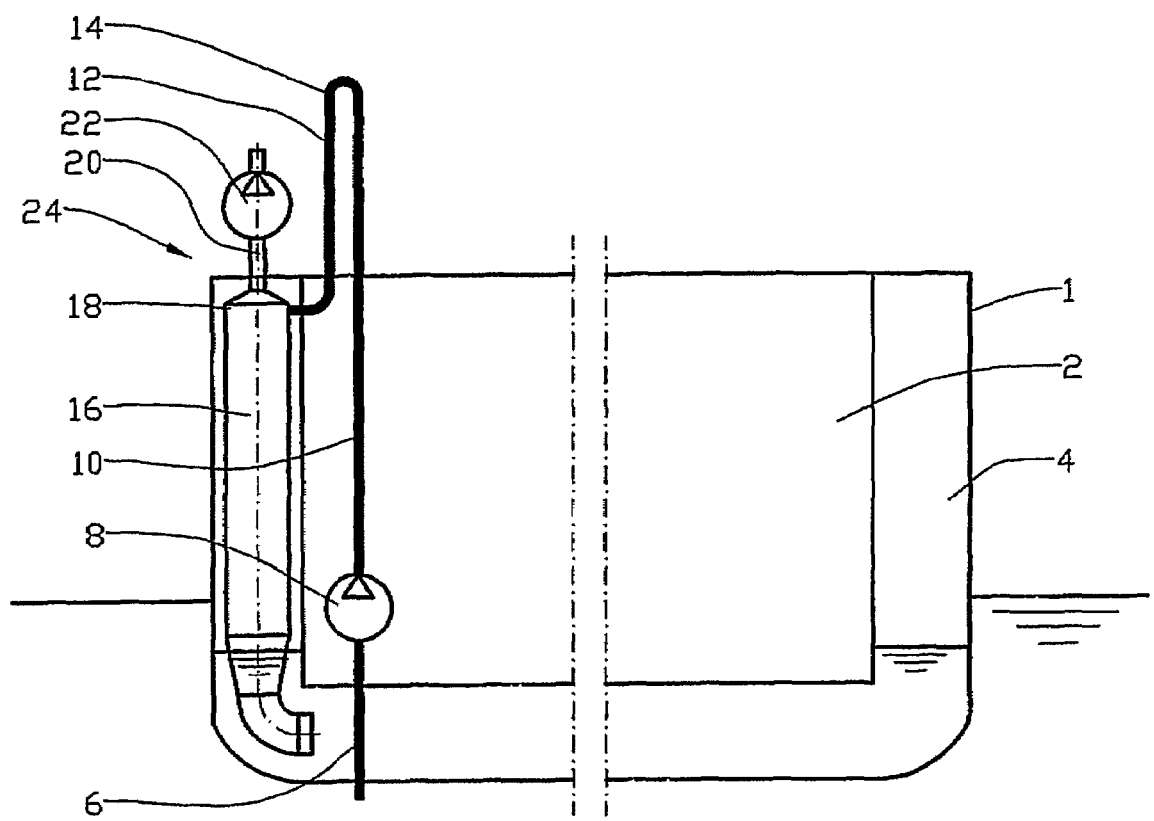
FIG. 2 is a schematic cross section of a ship fitted with a plant comprising a separating pipe for extracting gases from ballast water.

In the drawings, reference number 1 denotes a ship comprising a number of cargo holds or cargo oil tanks 2 and ballast compartments 4.

A seawater intake pipe 6 runs from the outside of the ship 1 to a ballast pump 8 that is designed to pump the water on through a pump pipe 10 and up to the upper part 14 of a downcomer 12. The downcomer 12 extends mainly vertically down to the ballast compartment of the ship 1, where the ballast water can be distributed between several ballast compartments 4 by means of distribution headers and valves (not shown).

Nitrogen or a nitrogen mix may advantageously be dosed in through a gas pipe 15, at the upper part 14 of the downcomer 12. The water and the nitrogen will drop through the downcomer 12 in a mainly turbulent flow, whereby the nitrogen combines with the oxygen in the water. The resulting gas is vented from the ballast compartment 4, see arrow in FIG. 1.

In an alternative embodiment, the lower part of the downcomer 12 is connected, tangentially and in a horizontal direction, to a vertically mounted separating pipe 16.

The lower part of the separating pipe 16 discharges into one of the ballast tanks 4, and the ballast water may be distributed to other ballast tanks 4 by means of pipes and valves (not shown).

The upper part 18 of the separating pipe 16 is connected to an extraction pipe 20 that passes on to an extract pump 22.

The point of connection of the extraction pipe 20 to the upper part 18 of the separating pipe 16 is located at a slightly higher vertical level relative to where the downcomer 12 enters the separating pipe 16.

In this embodiment, components 6, 8, 10, 12, 16, 20 and 22 form a degassing plant 24.

Water flowing down through the downcomer 12 will due to the height of fall be subjected to a negative pressure, which facilitates the release of gases from the water.

The water and the gases flow into the separating pipe 16 at a tangent, which sets them in rotational motion in the separating pipe 16. The rotation causes the water to be thrown to the walls of the separating pipe 16, while gases flow in towards the centre of the separating pipe, where they are extracted through the extraction pipe 20 by means of the extract pump 22.

The degassed water flows onwards, down through the separating pipe 16 and then into the ballast tanks 4.

Figure 3:
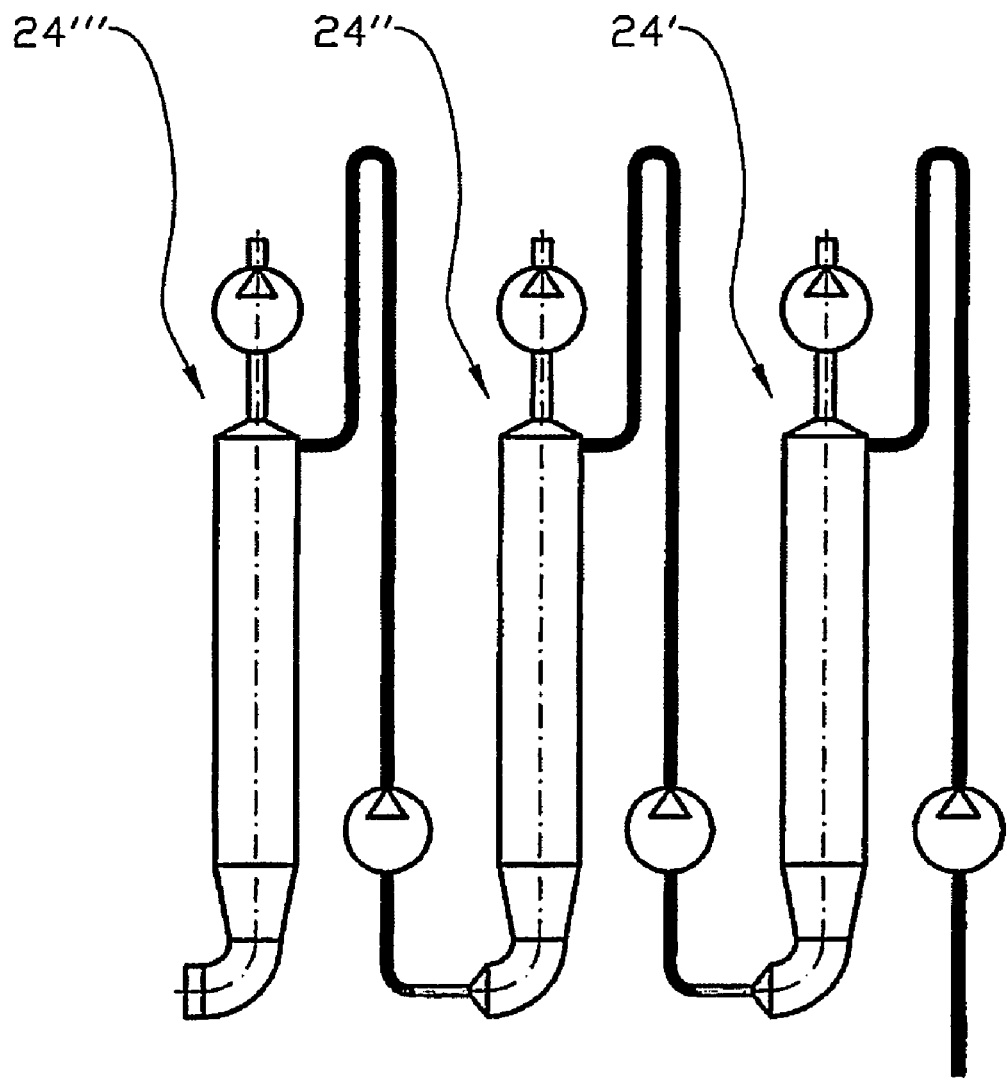
FIG. 3 schematically shows a plant for extracting gases from water, and where the process is repeated in three stages.

FIG. 3 shows an alternative embodiment suited for removal of gases e.g. from water to be pumped into a petroleum reservoir. In this embodiment, three degassing plants 24', 24" and 24''' are assembled in series in order to further increase the fraction of gas removed from the water.

The water flows through the first degassing plant 24' in the above described manner, whereupon it is pumped in a similar manner through the second degassing plant 24" and then on through the third degassing plant 24'''.

The invention claimed is:

1. A device for reducing oxygen content of seawater constituting ballast water on a ship, wherein the ballast water is introduced into an upper part of a downcomer, whereby a pressure drop arises in the upper part of the downcomer, facilitating a separation of gas from the ballast water, the separated gas being able to leave the ballast water after flowing through the downcomer together with the ballast water, characterized in that the upper part of the downcomer is situated well above the ship's deck, and is directly connected to a water supply pipe, and wherein a lower part of the downcomer is communicating with a ballast compartment of the ship.

2. A device according to claim 1, wherein the upper part of the downcomer communicates with a gas pipe, wherein the gas pipe is arranged to deliver nitrogenous gas to the downcomer.

3. A device according to claim 1, wherein the lower part of the downcomer is coupled, generally in the horizontal direction, to an upper part of a vertical separating pipe, wherein the upper part of the vertical separating pipe is coupled to an extraction pipe at a slightly higher level than that of the point of connection of the downcomer to the separating pipe.

4. A device according to claim 3, wherein the connection between the downcomer and the separating pipe is tangential.

* * * * *

UNITED STATES PATENT AND TRADEMARK OFFICE
CERTIFICATE OF CORRECTION

| | | |
|---|---|---|
| PATENT NO. | : 7,625,438 B2 | Page 1 of 1 |
| APPLICATION NO. | : 10/565890 | |
| DATED | : December 1, 2009 | |
| INVENTOR(S) | : Per Lothe | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 673 days.

Signed and Sealed this

Second Day of November, 2010

David J. Kappos
*Director of the United States Patent and Trademark Office*